US012770511B2

(12) United States Patent
Hiramatsu

(10) Patent No.: US 12,770,511 B2
(45) Date of Patent: Oct. 20, 2026

(54) ROUTE GENERATION DEVICE, VEHICLE CONTROL DEVICE, AND VEHICLE ROUTE DISTRIBUTION SYSTEM

(71) Applicant: HITACHI ASTEMO, LTD., Hitachinaka (JP)

(72) Inventor: Yoshihisa Hiramatsu, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/877,789

(22) PCT Filed: Mar. 6, 2023

(86) PCT No.: PCT/JP2023/008347
§ 371 (c)(1),
(2) Date: Dec. 20, 2024

(87) PCT Pub. No.: WO2023/248544
PCT Pub. Date: Dec. 28, 2023

(65) Prior Publication Data

US 2025/0384768 A1 Dec. 18, 2025

(30) Foreign Application Priority Data

Jun. 24, 2022 (JP) ................................ 2022-101860

(51) Int. Cl.
*G08G 1/0968* (2006.01)
*G08G 1/01* (2006.01)
*G08G 1/0965* (2006.01)

(52) U.S. Cl.
CPC ..... *G08G 1/096844* (2013.01); *G08G 1/0112* (2013.01); *G08G 1/0965* (2013.01); *G08G 1/096816* (2013.01)

(58) Field of Classification Search
None
See application file for complete search history.

(56) References Cited

U.S. PATENT DOCUMENTS

2012/0033123 A1* 2/2012 Inoue .................... H04N 7/181
348/333.13
2020/0193810 A1* 6/2020 Kusama .............. G08G 1/0137
(Continued)

FOREIGN PATENT DOCUMENTS

JP 2019-168998 A 10/2019
JP 2020166412 A * 10/2020

OTHER PUBLICATIONS

Machine translation of JP-2020166412-A (Year: 2026).*
(Continued)

*Primary Examiner* — Jennifer M Anda
(74) *Attorney, Agent, or Firm* — Foley & Lardner LLP

(57) ABSTRACT

Provided are a route generation device, a vehicle control device, and a vehicle route distribution system capable of making an emergency vehicle reach a destination without delay. Provided on a server (100) that generates and distributes route information are a route generation unit (101) that generates route information from map information and destination information of a vehicle, a route information storage unit (102) that saves the route information, a general vehicle traffic count calculation unit (104) that calculates the number of general vehicles traveling on a travel route of an emergency vehicle, and an emergency vehicle travel lane generation unit (105) that generates travel lane information that determines whether a lane on which the emergency vehicle travels passes a current travel lane, an opposite lane, or a middle between the travel lane and the opposite lane.

6 Claims, 15 Drawing Sheets

(56) References Cited

U.S. PATENT DOCUMENTS

| | | | | |
|---|---|---|---|---|
| 2020/0250973 | A1* | 8/2020 | Ohe | G08G 1/096775 |
| 2021/0201674 | A1* | 7/2021 | Oyama | G08G 1/207 |
| 2023/0143613 | A1* | 5/2023 | Yilma | G08G 1/0112<br>701/117 |
| 2023/0154312 | A1* | 5/2023 | Mori | G08G 1/0112<br>701/117 |
| 2023/0264689 | A1* | 8/2023 | Hiramatsu | B60W 40/04<br>701/301 |
| 2023/0347939 | A1* | 11/2023 | Nakano | B60W 60/0015 |
| 2025/0201114 | A1* | 6/2025 | Irie | G08G 1/015 |

OTHER PUBLICATIONS

International Search Report with English Translation and Written Opinion of International Patent Application No. PCT/JP2023/008347 dated May 16, 2023 (8 pages).

* cited by examiner

〈DRIVING LANE 1〉

〈DRIVING LANE 1〉

〈CALCULATION OF EVACUATION LANE〉

〈EMERGENCY VEHICLE DRIVING ROUTE (WITH LANE INFORMATION)〉

〈EMERGENCY VEHICLE DRIVING ROUTE〉

ROUTE GENERATION DEVICE, VEHICLE CONTROL DEVICE, AND VEHICLE ROUTE DISTRIBUTION SYSTEM

TECHNICAL FIELD

The present invention relates to a route generation device, a vehicle control device, and a vehicle route distribution system in consideration of emergency vehicle travel.

BACKGROUND ART

In vehicle control, it is very difficult to recognize and appropriately avoid an emergency vehicle. In order for an emergency vehicle such as an ambulance to arrive at a destination without delay in consideration of its urgency, it is necessary to solve problems such as "The travel of the emergency vehicle is hindered and the arrival at the destination is delayed depending on the congestion situation of the road, the manners of the drivers, and with or without compassionate driving due to experience and the like.". As a solution to the problem, for example, as described in PTL 1, there is a technique of "distributing the route of an emergency vehicle and guiding the vehicle to a route through which the emergency vehicle does not pass".

CITATION LIST

Patent Literature

PTL 1: JP 2019-168998 A

SUMMARY OF INVENTION

Technical Problem

However, the conventional technique described in PTL 1 has a problem in terms of privacy protection and crime prevention because the route of an emergency vehicle is distributed. That is, in order to distribute the route of an emergency vehicle, for example, there arises a problem that information having a risk in terms of privacy such as the destination of an ambulance, that is, a place where a sudden illness has occurred, or information having a risk in terms of crime prevention such as route information of a patrol car is distributed. In addition, the conventional technique described in PTL 1 does not consider that an emergency vehicle can partially or entirely cross over to the opposite lane, and hence results in inefficient control.

Therefore, an object of the present invention is to provide a route generation device, a vehicle control device, and a vehicle route distribution system capable of overcoming the above-described problems and allowing an emergency vehicle to reach a destination without delay.

Solution to Problem

The present invention for solving the above problems includes a route generation unit that generates route information from map information and destination information of a vehicle, a route information storage unit that stores the route information, a general vehicle traffic count calculation unit that calculates the number of general vehicles traveling on a travel route of an emergency vehicle from route information of the emergency vehicle and route information of a general vehicle stored in the route information storage unit, and an emergency vehicle travel lane generation unit that generates travel lane information for determining whether a lane on which the emergency vehicle travels passes a current travel lane, an opposite lane, or a middle between the travel lane and the opposite lane, from the numbers of the general vehicles on a travel lane and an opposite lane on the travel route of the emergency vehicle which are calculated by the general vehicle traffic count calculation unit.

Advantageous Effects of Invention

According to the present invention, it is possible to provide a route generation device, a vehicle control device, and a vehicle route distribution system capable of guiding an emergency vehicle to a destination without delay.

Problems, configurations, and effects other than those described above will be clarified by the following description of embodiments.

DESCRIPTION OF EMBODIMENTS

An embodiment of a vehicle route distribution system according to the present invention will be described below. In the vehicle route distribution system according to the present embodiment, the server side generates and distributes a route for evacuation or detouring so as not to disturb the travel of an emergency vehicle to the general vehicle on the basis of the route information of the emergency vehicle. That is, in the vehicle route distribution system according to the present embodiment, the server functions as a route generation device that generates and distributes route information of vehicles including emergency vehicles and general vehicles.

In addition, it is assumed that the vehicle side that does not perform automated driving notifies the driver of route information distributed from the server side so that the driver performs evacuation or detour. In the case of a vehicle capable of level 3 or higher automated driving, automated driving is assumed to evacuate or make a detour on the basis of distributed route information or road surrounding information on behalf of the driver. Embodiments of the present invention will be described in detail below with reference to the accompanying drawings.

Figure 1:
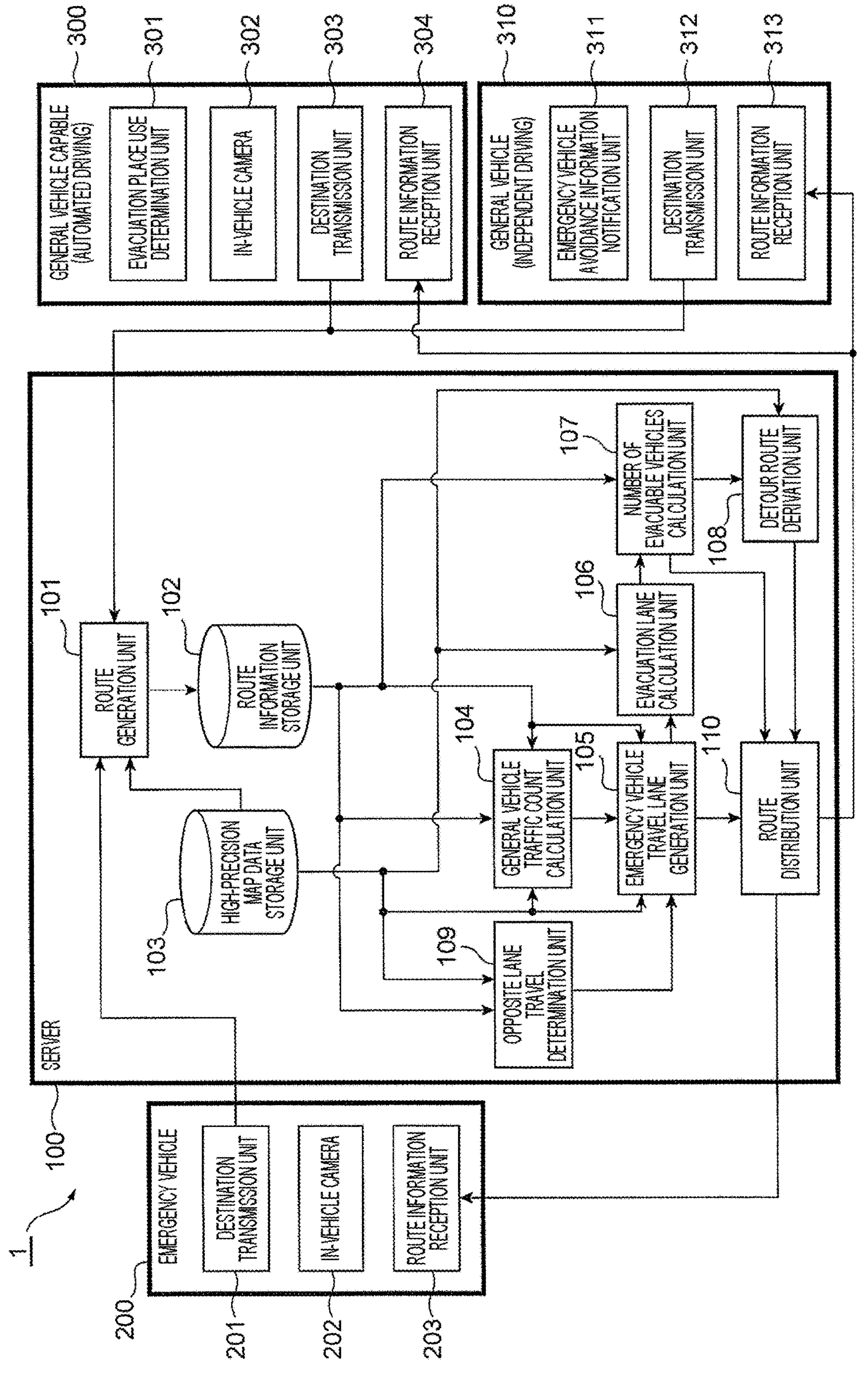
FIG. 1 is a configuration diagram of a vehicle route distribution system according to an embodiment of the present invention.

FIG. 1 is a functional block diagram including a server and an actual vehicle controller of a vehicle route distribution system 1 according to an embodiment of the present invention.

A server 100 includes, as functions implemented by software, a route generation unit 101, a general vehicle traffic count calculation unit 104, an emergency vehicle travel lane generation unit 105, an evacuation lane calculation unit 106, a number of evacuable vehicles calculation unit 107, a detour route derivation unit 108, an opposite lane travel determination unit 109, and a route distribution unit 110. In addition, a route information storage unit 102 and a high-precision map data storage unit 103 are provided as the information storage unit. Note that the map data stored in the high-precision map data storage unit 103 is map data including information corresponding to an HD map, such as vehicle travel lane information.

An emergency vehicle 200 includes a destination transmission unit 201 for transmitting a destination to the server 100 and a route information reception unit 203 for receiving route information distributed from the server 100. In addition, the emergency vehicle 200 includes an in-vehicle camera 202 for use in automated driving or a driving support system.

A general vehicle 300 that supports automated driving includes a destination transmission unit 303 that transmits a destination to the server 100, a route information reception unit 304 that receives route information distributed from the server 100, an in-vehicle camera 302 that recognizes vehicle peripheral information, and an evacuation place use determination unit 301 that determines whether to evacuate at an evacuation place using the vehicle peripheral information and the route information recognized by the in-vehicle camera 302.

A general vehicle 310 that does not support automated driving includes a destination transmission unit 312 for transmitting a destination to the server 100, a route information reception unit 313 for receiving route information distributed from the server 100, and an emergency vehicle avoidance information notification unit 311 for guiding a driver to an evacuation place or an avoidance route (detour route) of a general vehicle based on the route information distributed from the server 100.

The destination transmission units 201, 303, and 312 of the vehicles 200, 300, and 310 are processing units that transmit destination information input from the drivers who drives the vehicles 200, 300, and 310 to the server 100. The route generation unit 101 generates routes on which the vehicles 200, 300, and 310 travel from the transmitted destination information by using the high-precision map data stored in the high-precision map data storage unit 103 and saves the route information in the route information storage unit 102.

The general vehicle traffic count calculation unit 104 is a process of calculating how many general vehicles 300 and 310 are present on the travel lane and the opposite lane of the travel route of the emergency vehicle 200 (in other words, the numbers of the general vehicles 300 and 310 traveling on the travel route of the emergency vehicle 200) by using the route information of the emergency vehicle 200 saved in the route information storage unit 102, the route information of the general vehicles 300 and 310, and the high-precision map data stored in the high-precision map data storage unit 103.

The number of traveling general vehicles calculated here is a numerical value used as a measure of how crowded the road is when the emergency vehicle passes. Therefore, when the emergency vehicle passes through a certain point, calculation is started from the number of general vehicles that may exist on the traveling road in a section of a distance 2L determined before and after the emergency vehicle at that timing. For example, when the emergency vehicle enters another road by turning at an intersection, getting on or off a toll road at an interchange, or the like, the number of general vehicles included in the sections, each having a distance L, determined before and after the emergency vehicle entering another road is newly calculated again. This is based on the idea that the degree of congestion should be calculated for each road since the road after entry and the road on which the vehicle is currently traveling do not necessarily have the same degree of congestion.

Figure 2:
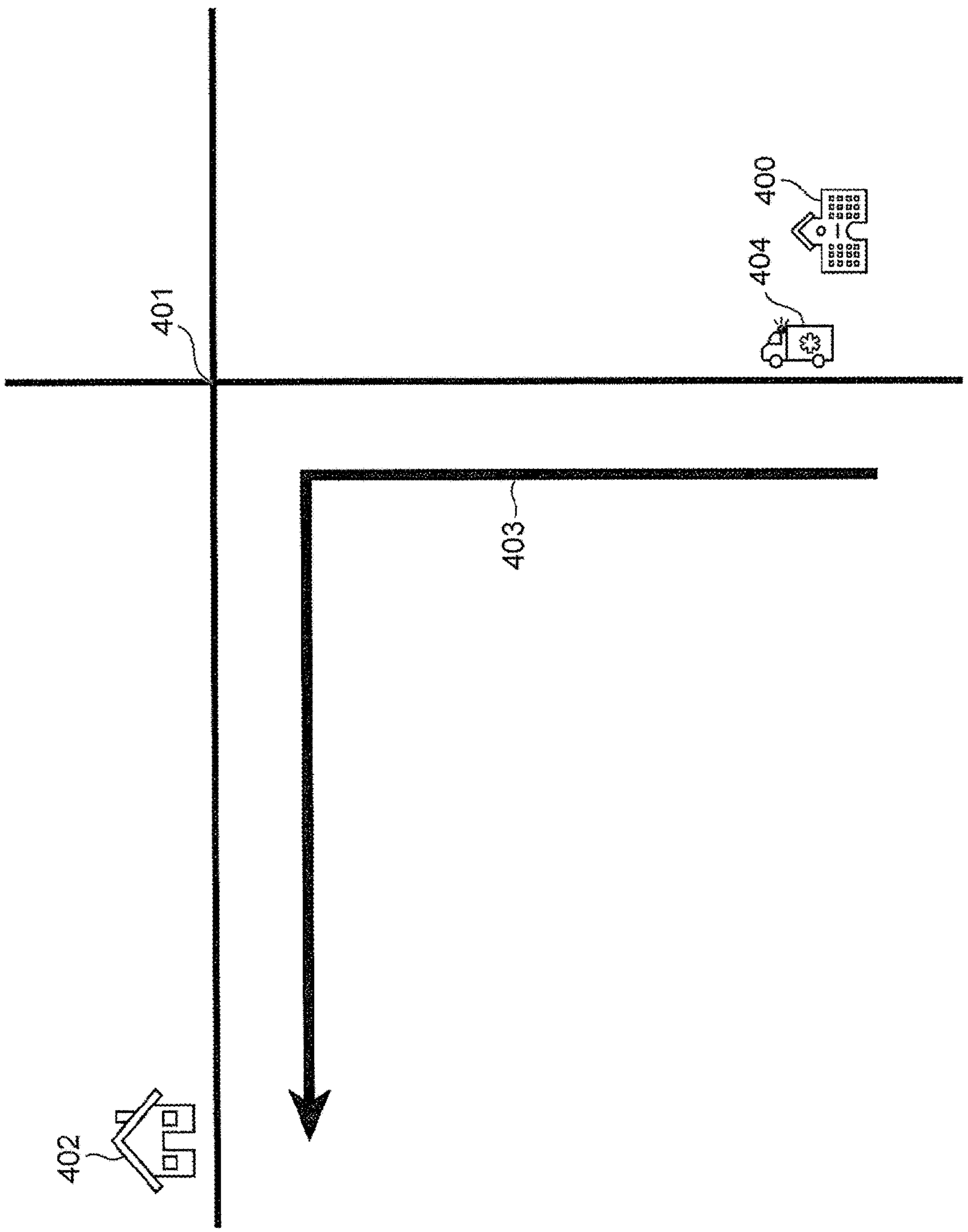
FIG. 2 is an explanatory diagram of a general vehicle traffic count calculation unit.
Figure 3:
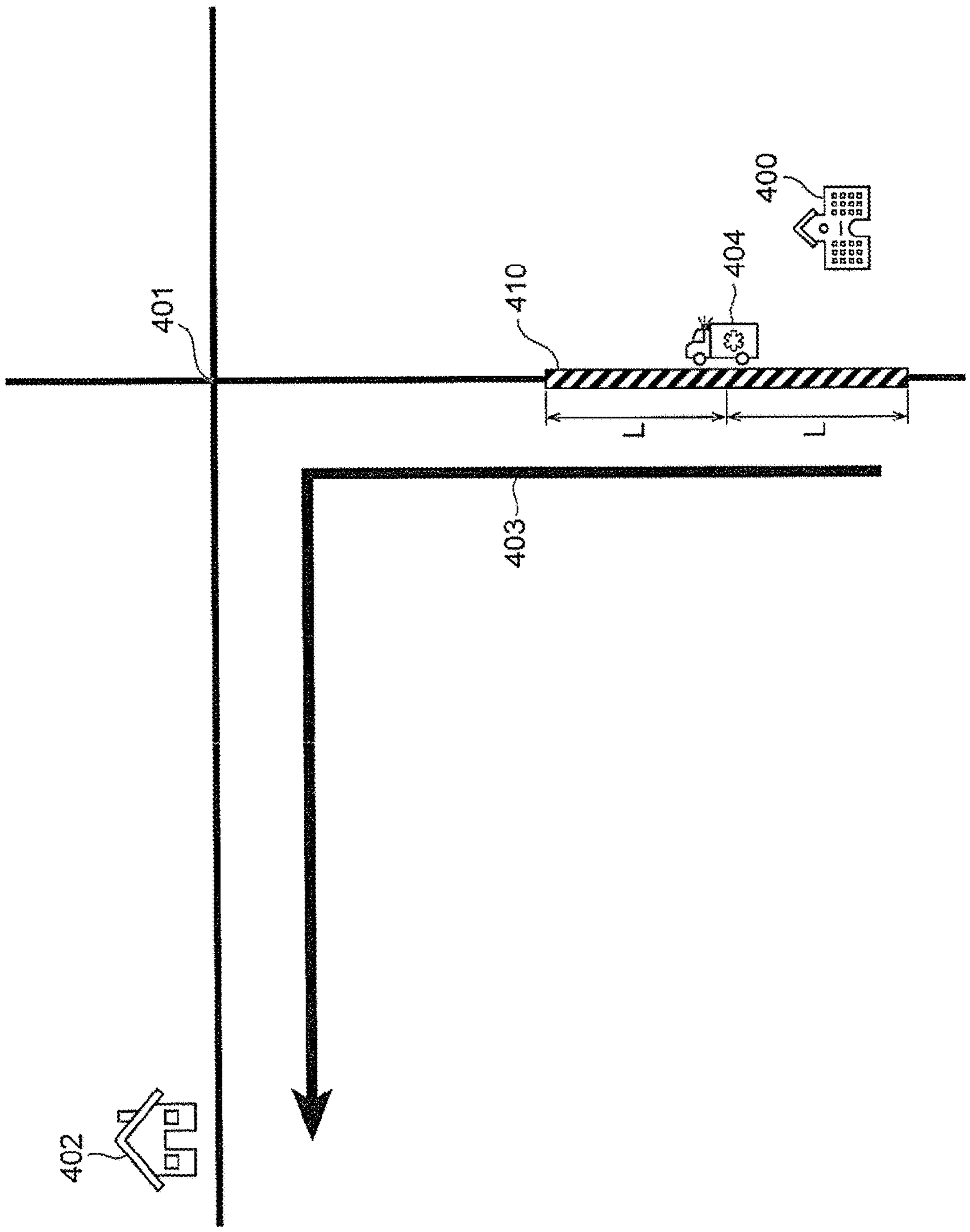
FIG. 3 is an explanatory diagram of the general vehicle traffic count calculation unit.

The above processing will be described with reference to an example of an emergency vehicle 404 that departs from a departure place 400, turns left at an intersection 401, and travels on a route 403 toward a destination 402 as illustrated in FIG. 2. At this time, when the entire section of the distance 2L before and after the emergency vehicle 404 are on the route 403 as illustrated in FIG. 3, the number of general vehicles traveling in the section of the distance 2L (410 in FIG. 3) before and after the emergency vehicle 404 on the route 403 is counted as it is.

Figure 4:
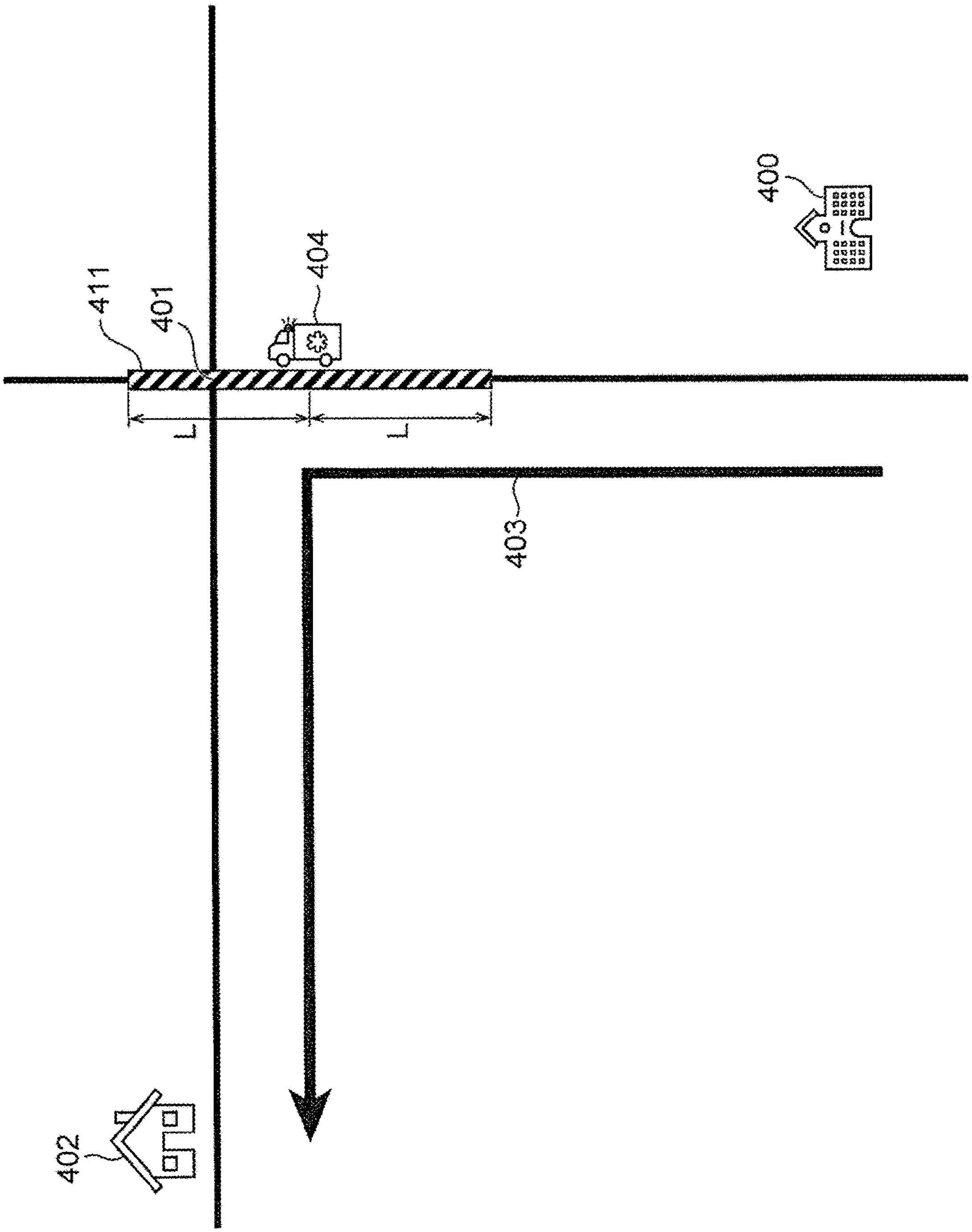
FIG. 4 is an explanatory diagram of the general vehicle traffic count calculation unit.
Figure 5:
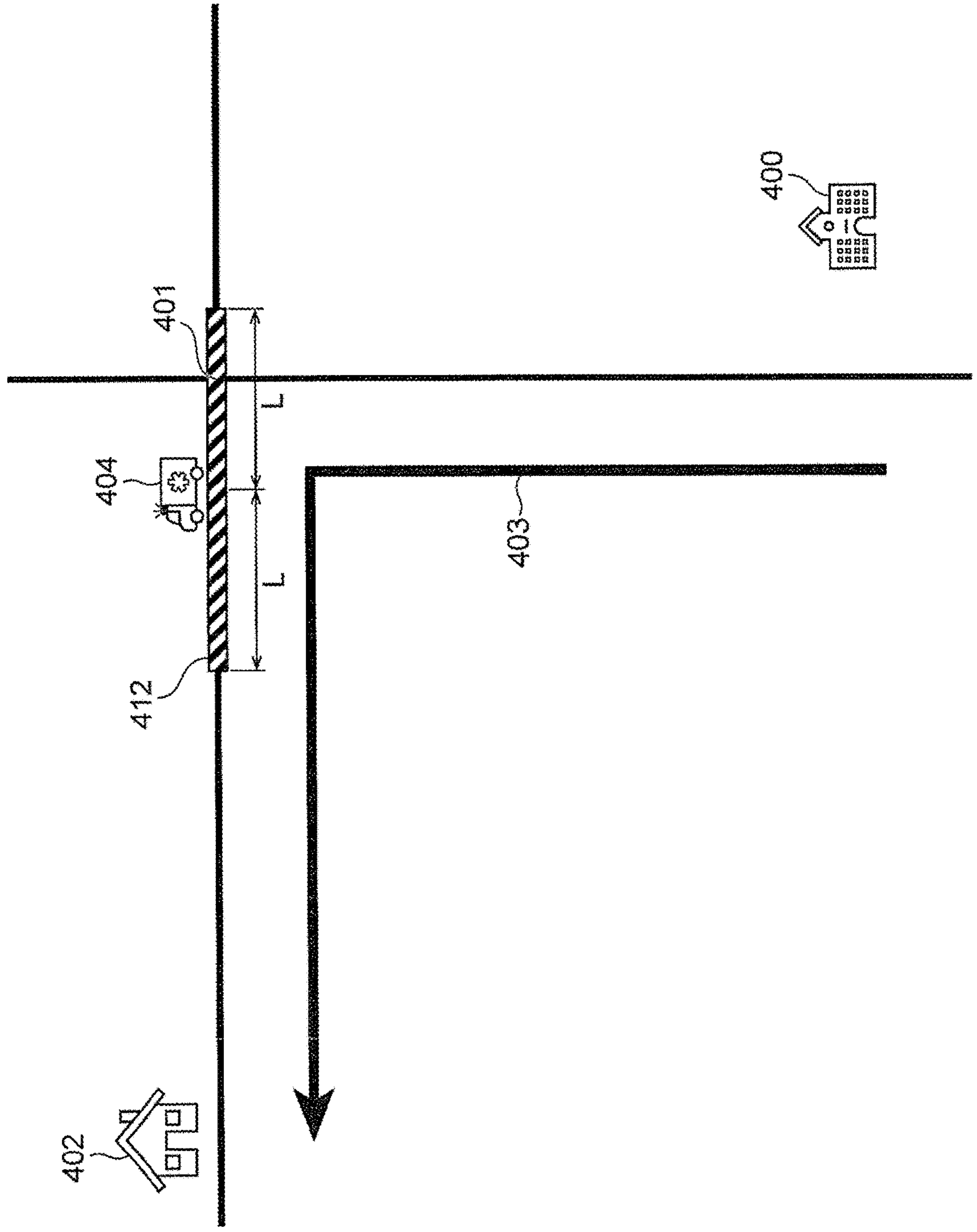
FIG. 5 is an explanatory diagram of the general vehicle traffic count calculation unit.

On the other hand, as illustrated in FIG. 4, when the vehicle enters a different road in the section of the distance L before the emergency vehicle 404 immediately before turning to the intersection 401 or the like, the numbers of general vehicles traveling in the section of the distance L and the section of the distance L before and after the emergency vehicle 404 (411 in FIG. 4) on the "road on which the general vehicle is currently traveling" are counted. When the vehicle enters from a different road in the section of the distance L after the emergency vehicle 404 immediately after turning at the intersection 401 or the like, the numbers of general vehicles traveling in the section of the distance L and the section of the distance L before and after the emergency vehicle 404 (412 in FIG. 5) on the "road on which the general vehicle is currently traveling" are counted.

The opposite lane travel determination unit 109 is a process of calculating a location where the vehicle can cross over to the opposite lane on the route of the emergency vehicle 200 (that is, determining whether it is possible to enter the opposite lane) using the route information of the emergency vehicle 200 saved in the route information storage unit 102 and the high-precision map data stored in the high-precision map data storage unit 103. In this case, the state in which the vehicle cannot cross over to the opposite lane is a state in which an obstacle that physically hinders the vehicle from crossing over, such as a median strip or a center pole, is installed on the center line (between the travel lane and the opposite lane), and the high-precision map data stored in the high-precision map data storage unit 103 is map information holding these pieces of information.

The emergency vehicle travel lane generation unit 105 is a process of calculating a lane (travel lane) on which the emergency vehicle 200 can travel using the number of general vehicles 300 and 310 traveling on the travel route of the emergency vehicle 200 calculated by the general vehicle traffic count calculation unit 104, information indicating whether it is possible to cross over to the opposite lane (that is, information indicating whether it is possible to enter the opposite lane) calculated (generated) by the opposite lane travel determination unit 109, the route information of the emergency vehicle 200 saved in the route information storage unit 102, and the high-precision map data stored in the high-precision map data storage unit 103.

Figure 6:
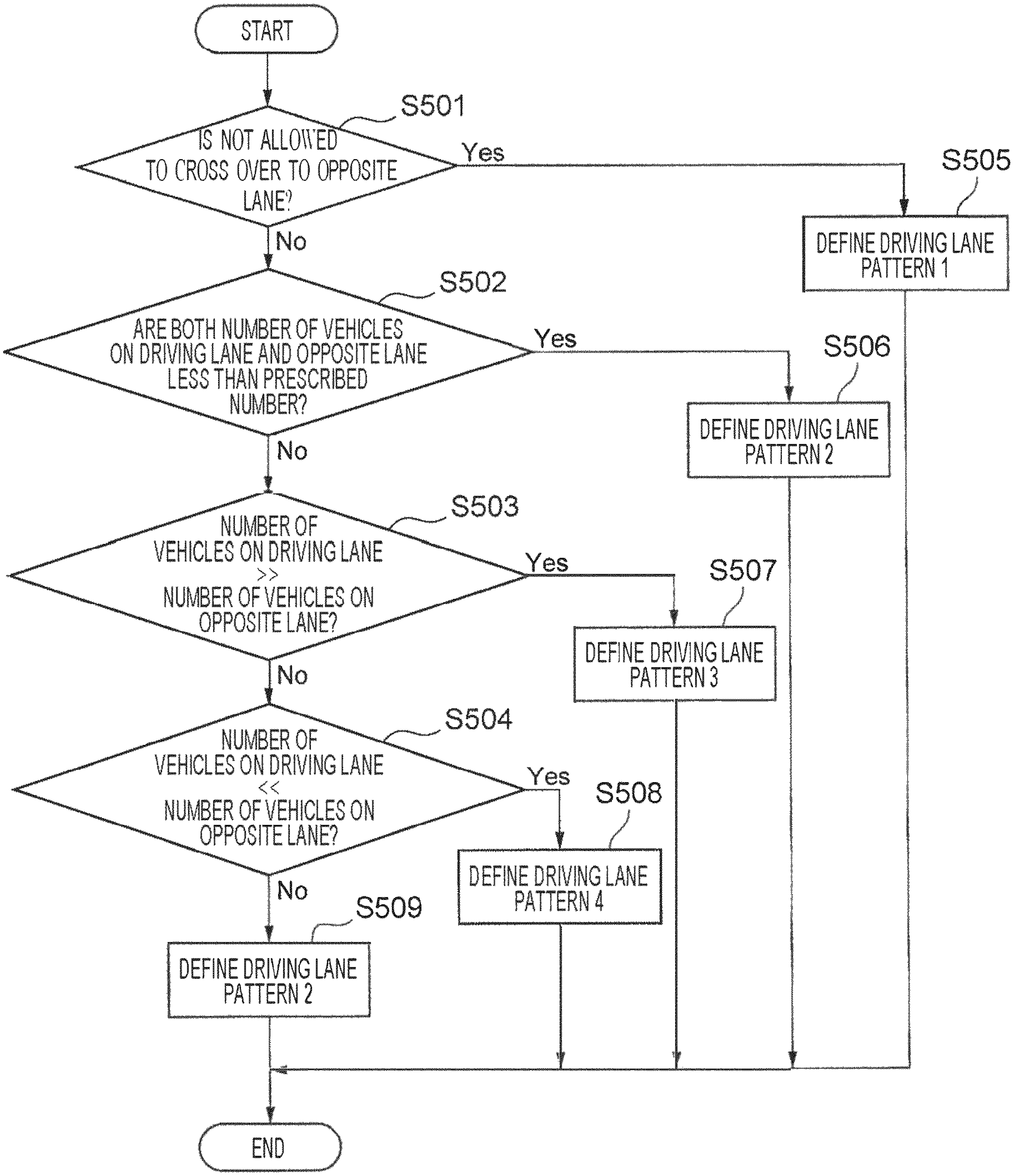
FIG. 6 is a flowchart of an emergency vehicle travel lane generation unit.

FIG. 6 illustrates a flowchart related to the travel lane determination logic of the emergency vehicle travel lane generation unit 105. This process is executed each time the destination information is transmitted from the emergency vehicle 200 and the route information of the emergency vehicle 200 is determined.

First, in S501, it is determined whether the vehicle can cross over to the opposite lane based on the information indicating whether it is possible to cross over to the opposite lane generated by the opposite lane travel determination unit 109. When the vehicle cannot cross over to the opposite lane, the travel lane information of the emergency vehicle 200 is set to "travel lane pattern 1" defined in S505.

If the conditional branching in S501 is false, the number of general vehicles 300 and 310 traveling on the travel route of the emergency vehicle 200 on each lane calculated by the general vehicle traffic count calculation unit 104 is checked in S502. It is then checked whether both the numbers of general vehicles on the travel lane and the opposite lane are less than the prescribed number. When both the numbers of vehicles are less than the prescribed number, it is considered that both the travel lane and the opposite lane are not congested, and the travel lane information of the emergency vehicle 200 is set to "travel lane pattern 2" defined in S506.

If the conditional branch in S502 is false, in S503 and S504, the number of general vehicles 300 and 310 traveling on the travel route of the emergency vehicle 200 on each lane calculated by the general vehicle traffic count calculation unit 104 is checked. It is then checked "whether the number of vehicles on the travel lane is very large compared to the number of vehicles on the opposite lane (condition S503)" and "whether the number of vehicles on the travel lane is very small compared to the number of vehicles on the opposite lane (condition S504)". If the condition S503 is true, the travel lane information of the emergency vehicle 200 is set to "travel lane pattern 3" defined in S507. If the condition S504 is true, the travel lane information of the emergency vehicle 200 is set to "travel lane pattern 4" defined in S508. If both the condition S503 and the condition S504 are false, the travel lane information of the emergency vehicle 200 is set to "travel lane pattern 2" defined in S509.

Figure 7:
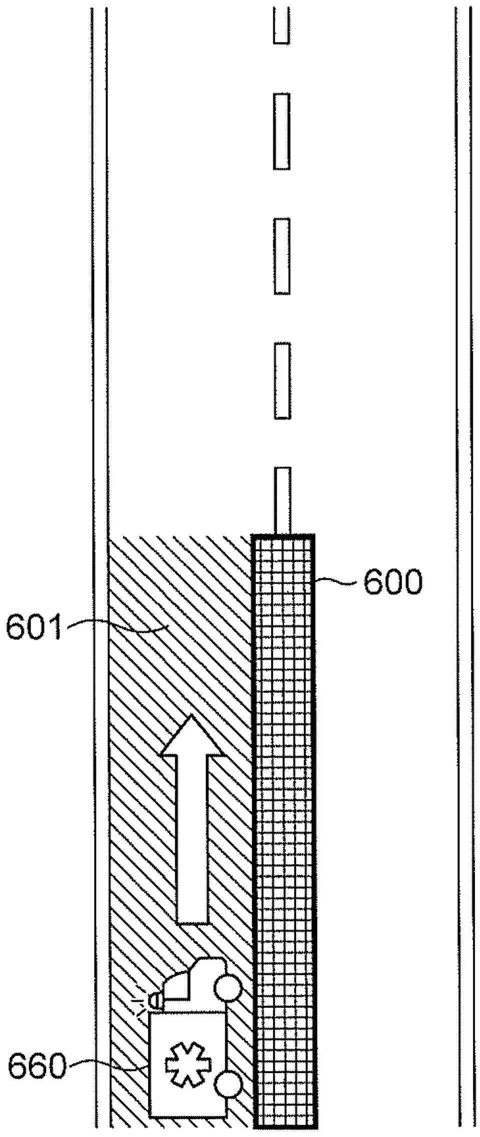
FIG. 7 is an explanatory diagram of the emergency vehicle travel lane generation unit.

FIG. 7 illustrates "travel lane pattern 1" defined in S505 described above. In this case, since there is an obstacle such as a median strip at 600 between the travel lane and the opposite lane and it is impossible to cross over to the opposite lane, an emergency vehicle 660 can travel only on a travel lane 601 along the original travel lane regardless of the numbers of vehicles on the travel lane and the opposite lane. When the obstacle 600 is interrupted, the vehicle can cross over to the opposite lane. Therefore, the lane on which the vehicle can travel is calculated again the numbers of general vehicles traveling on the travel lane and the opposite lane.

Figure 8:
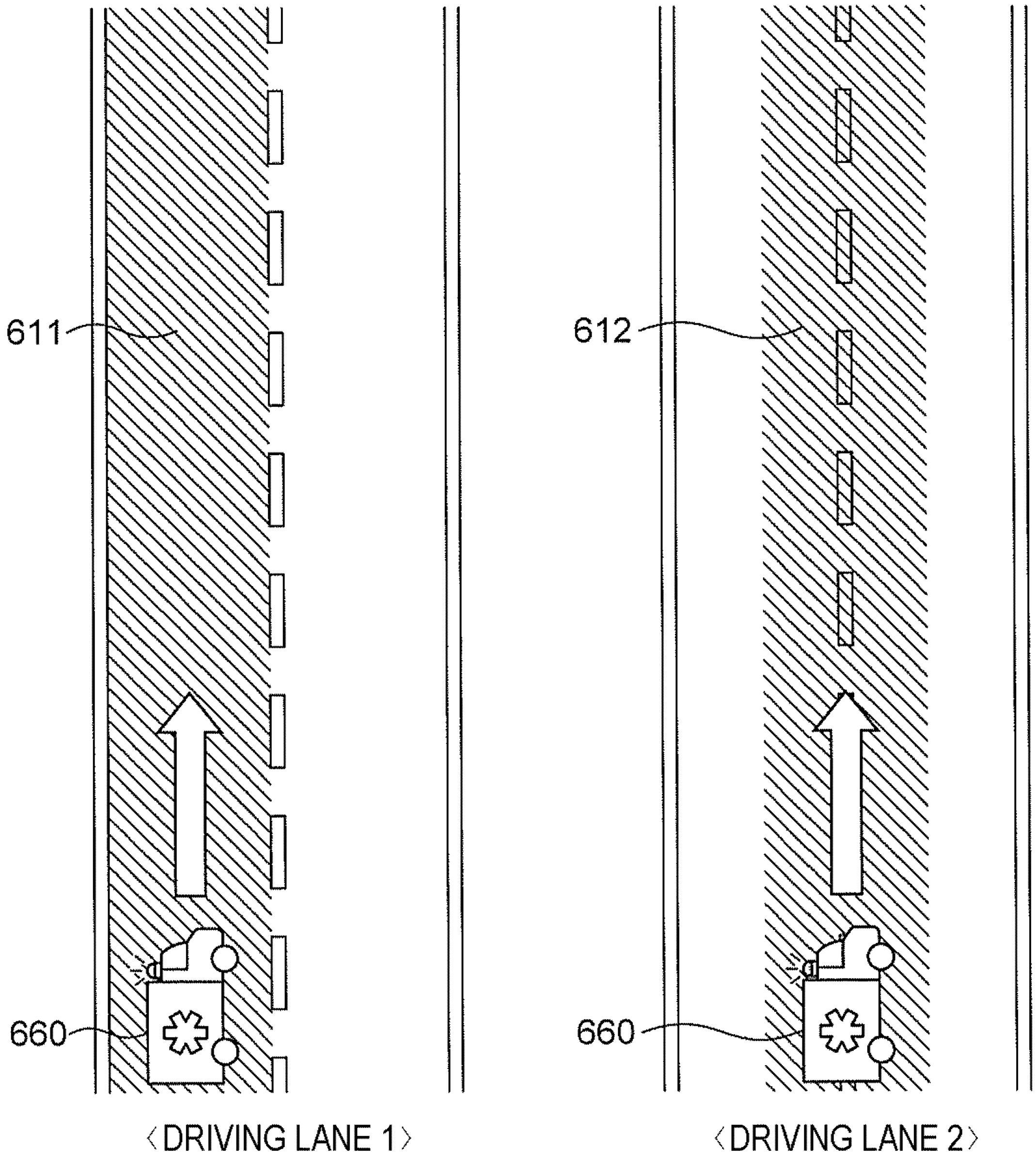
FIG. 8 is an explanatory diagram of the emergency vehicle travel lane generation unit.

FIG. 8 illustrates "travel lane pattern 2" defined in S506 and S509 described above. This travel lane pattern assumes that general vehicles are evacuated to the road shoulders to pass the emergency vehicle 660 in a state where neither the travel lane nor the opposite lane is congested or both lanes are congested. In this case, it is assumed that the travel lane of the emergency vehicle 660 is a lane 612 to let the emergency vehicle 660 travel crossing the center line (in other words, travel between the travel lane and the opposite lane) to avoid general vehicles stopping on the road shoulders in addition to a lane 611 as the current travel lane.

Figure 9:
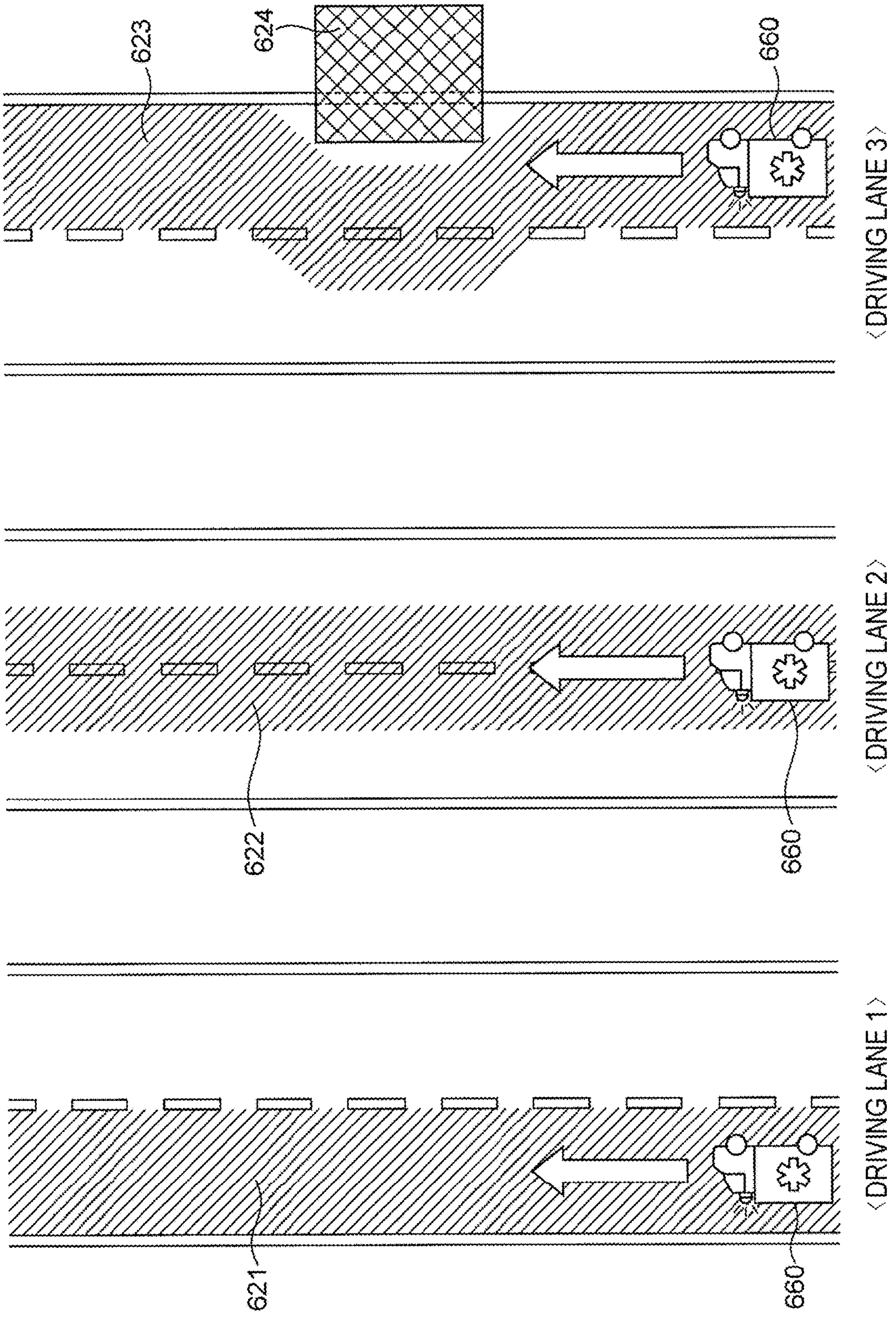
FIG. 9 is an explanatory diagram of the emergency vehicle travel lane generation unit.

FIG. 9 illustrates "travel lane pattern 3" defined in S507 described above. This travel lane pattern assumes that the emergency vehicle 660 completely crosses over to the opposite lane to avoid general vehicles in a state in which the travel lane of the emergency vehicle 660 is very congested and it is difficult for the general vehicles on the travel lane to evacuate. In this case, it is assumed that the travel lane of the emergency vehicle 660 is a lane 622 to let the emergency vehicle 660 travel crossing the center line (in other words, travel between the travel lane and the opposite lane) to avoid general vehicles stopping on the road shoulders in addition to a lane 621 as the current travel lane and is a lane 623 to avoid a general vehicle by completely crossing over to the opposite lane. In this case, it is assumed that all the vehicles on the opposite lane are basically all detoured. However, it is assumed that there are some vehicles, such as a route bus, which cannot make a detour, and the travel lane 623 that completely enters the opposite lane and travels is a travel lane that draws a track with evacuation spots such as a spot 624 provided in some places.

Figure 10:
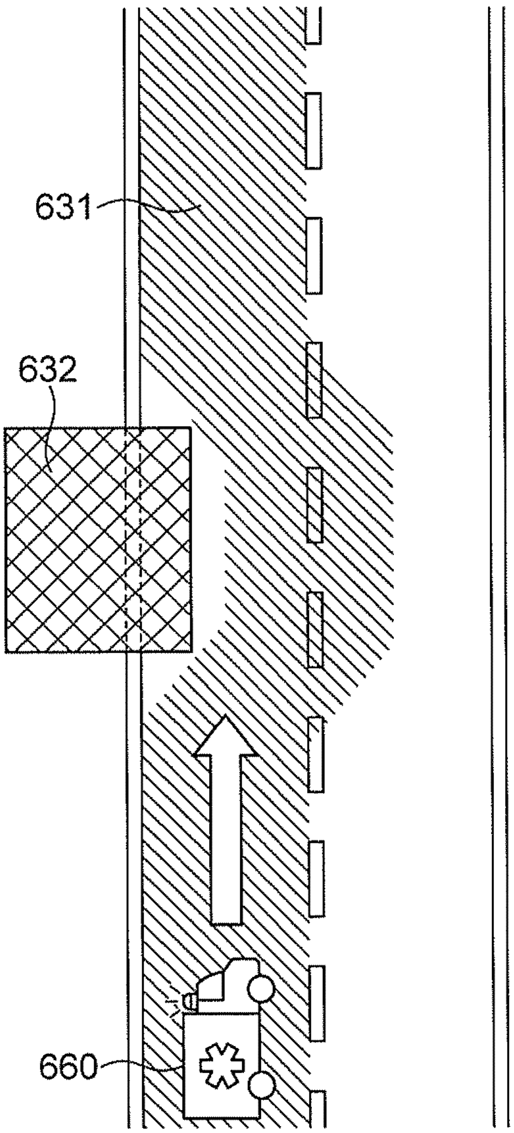
FIG. 10 is an explanatory diagram of the emergency vehicle travel lane generation unit.

FIG. 10 illustrates "travel lane pattern 4" defined in S508 described above. This travel lane pattern assumes that the opposite lane of the emergency vehicle 660 is very congested, and it is difficult for the emergency vehicle 660 to avoid general vehicles by crossing over to the opposite lane. In this case, it is assumed that the travel lane of the emergency vehicle 660 is only a lane 631 which is the current travel lane of the emergency vehicle. In this case, it is assumed that all the general vehicles on the travel lane of the emergency vehicle 660 make a detour, but it is assumed that there are some vehicles, such as a route bus, that cannot make a detour, and the travel lane 631 is a travel lane that draws a track with evacuation spots such as a spot 632 provided in some places.

In this manner, the emergency vehicle travel lane generation unit 105 generates travel lane information for determining whether the lane on which the emergency vehicle 200 travels passes the current travel lane, the opposite lane, or the middle between the travel lane and the opposite lane (across the center line) based on, for example, the numbers of general vehicles 300 and 310 traveling on the travel lane and the opposite lane on the travel route of the emergency vehicle 200 calculated by the general vehicle traffic count calculation unit 104.

The evacuation lane calculation unit 106 is a process of calculating an evacuation lane for the evacuation of the general vehicles 300 and 310 from the emergency vehicle 200 using the travel lane of the emergency vehicle 200 calculated by the emergency vehicle travel lane generation unit 105 and the high-precision map data stored in the high-precision map data storage unit 103.

Figure 11:
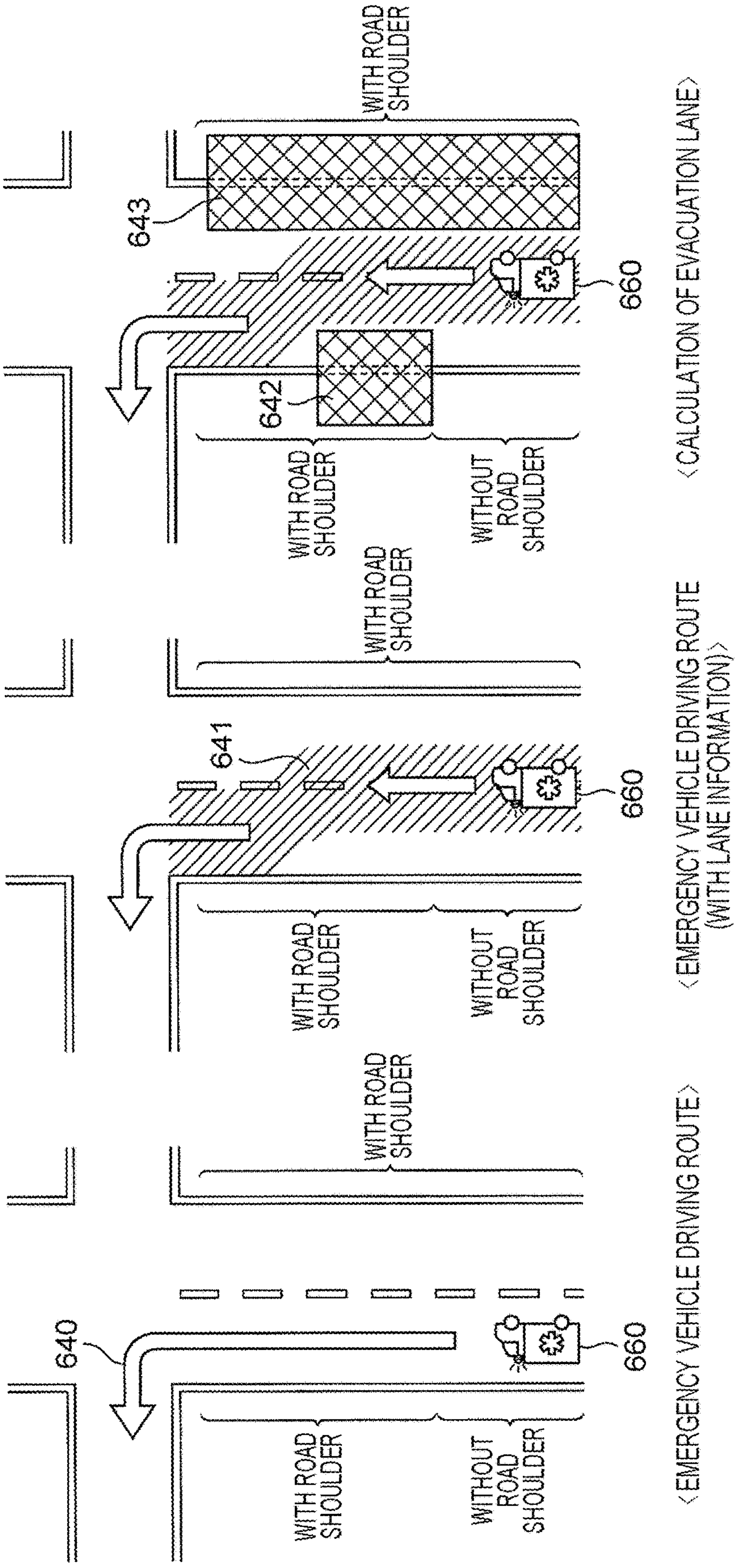
FIG. 11 is an explanatory diagram of an evacuation lane calculation unit.
Figure 12:
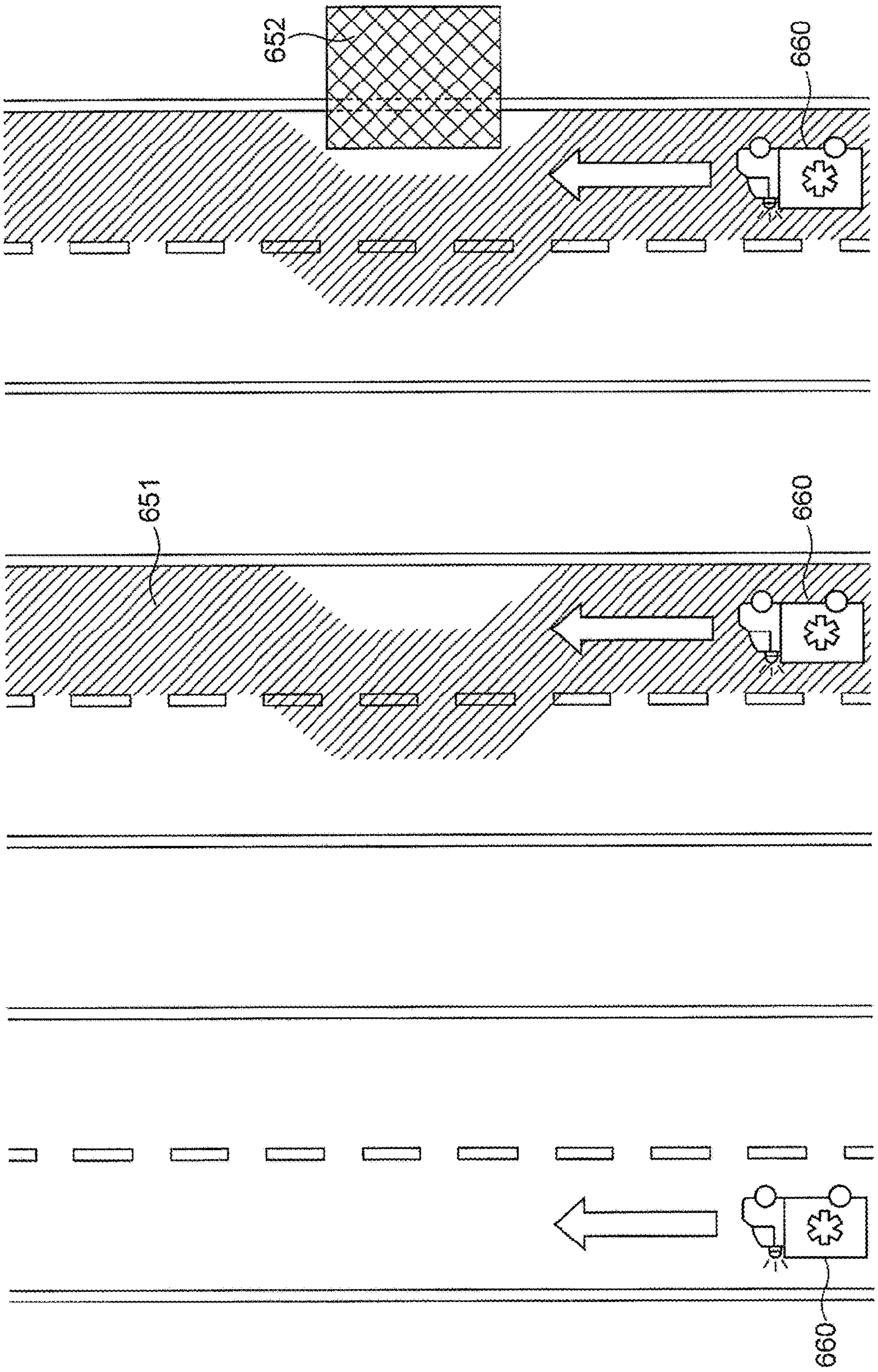
FIG. 12 is an explanatory diagram of the evacuation lane calculation unit.

FIGS. 11 and 12 are specific examples of the evacuation lane calculation unit 106.

An example of calculation of an evacuation lane of a general vehicle when the emergency vehicle 660 traveling with travel lane pattern 2 (FIG. 8) described above turns left at an intersection and travels will be described with reference to FIG. 11. The travel lane on which the emergency vehicle 660 travels along a route 640 with travel lane pattern 2 is a lane 641. At this time, "an area where the emergency vehicle can travel while crossing over to the opposite lane" and "an area where a road shoulder exists and a general vehicle can safely evacuate" are defined as evacuation lanes for general vehicles. In the example of FIG. 11, the evacuation lanes 642 and 643 correspond to the above definitions.

An example of calculation of an evacuation lane of a general vehicle when there is the emergency vehicle 660 traveling with travel lane pattern 3 (FIG. 9) described above will be described with reference to FIG. 12. According to travel lane pattern 3, since it is assumed that the emergency vehicle 660 completely enters the opposite lane and travels as indicated by a travel lane 651, general vehicles on the opposite lane can evacuate only to evacuation places 652 provided in some places. This area is defined as an evacuation lane of a general vehicle on the opposite lane.

The number of evacuable vehicles calculation unit 107 is a process of determining, for each evacuation lane, a vehicle to be evacuated to an evacuation lane and determining which vehicle is to be evacuated to which evacuation lane on the basis of the evacuation lanes of the general vehicles 300 and 310 calculated by the evacuation lane calculation unit 106 and the route information of the general vehicles 300 and 310 stored in the route information storage unit 102. In this process, the number of vehicles that can be evacuated is calculated from the area of the evacuation lane of the general vehicles 300 and 310. The number of general vehicles 300 and 310 on the route (the number of passing vehicles) derived from the route information storage unit 102 is compared with the number of evacuable vehicles calculated by the number of evacuable vehicles calculation unit 107. If all the general vehicles 300 and 310 on the route cannot evacuate to the evacuation lane due to, for example, the number of general vehicles 300 and 310 on the route exceeding the number of evacuable vehicles, priorities are set depending on the vehicle types, the destinations, and the like, so as to determine vehicles to be evacuated to the evacuation lane. As an example of the prioritization, a vehicle that is difficult to make a detour, such as a route bus, is preferentially evacuated to an evacuation lane.

The detour route derivation unit 108 is a process of generating a detour route (avoidance route) using the high-precision map data stored in the high-precision map data storage unit 103 for a vehicle to which no evacuation lane is allocated by the number of evacuable vehicles calculation unit 107 (that is, a vehicle that is given a low priority as a result of prioritization based on the vehicle type, the destination, and the like when the number of general vehicles 300 and 310 (the number of passing vehicles) on the route derived from the route information storage unit 102 is compared with the number of evacuable vehicles calculated by the number of evacuable vehicles calculation unit 107, and the number of general vehicles 300 and 310 on the route exceeds the number of evacuable vehicles) and a vehicle (determined on the vehicle side) to which an evacuation lane is allocated but which cannot be evacuated due to an obstacle or the like, such as a parked vehicle existing in the evacuation place.

Figure 13:
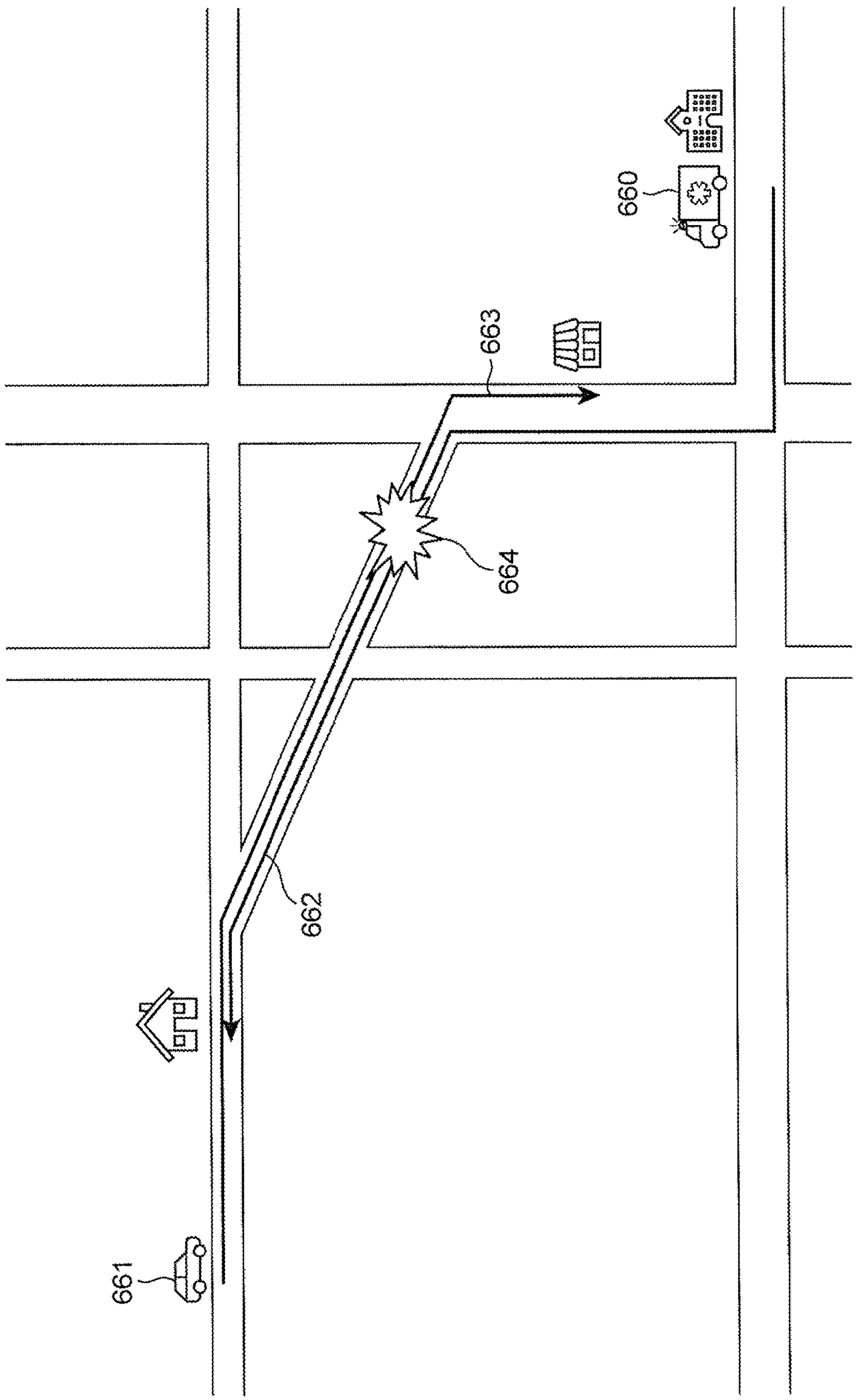
FIG. 13 is an explanatory diagram of a number of evacuable vehicles calculation unit and a detour route derivation unit.
Figure 14:
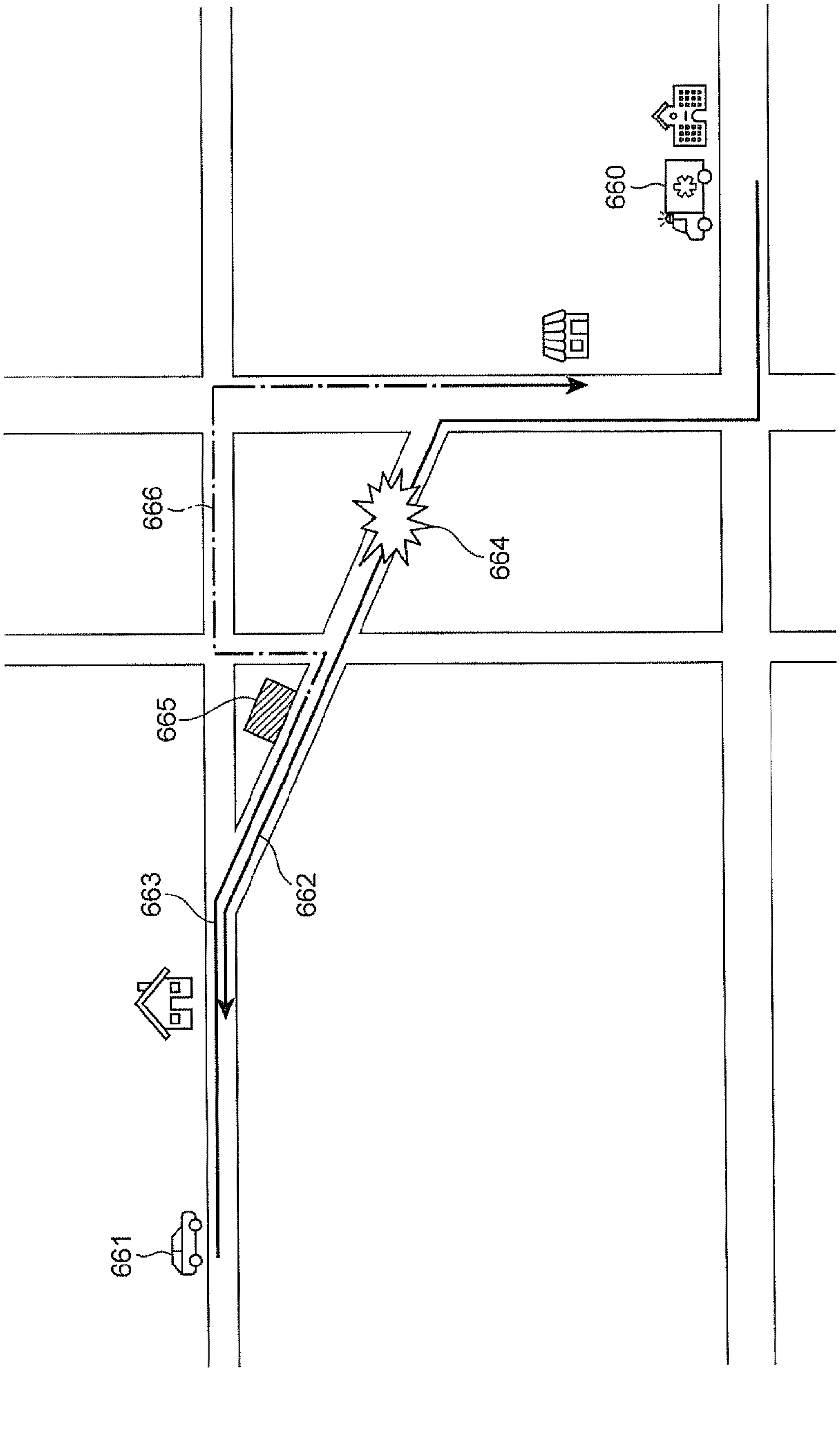
FIG. 14 is an explanatory diagram of the number of evacuable vehicles calculation unit and the detour route derivation unit.

FIGS. 13 and 14 illustrate a method of allocating an evacuation place by the number of evacuable vehicles calculation unit 107 and a method of generating a detour route by the detour route derivation unit 108 when evacuation is not possible.

FIG. 13 illustrates a case where the emergency vehicle 660 and the general vehicle 661 encounter each other on the same road. It is assumed that the emergency vehicle 660 travels along a route 662 and the general vehicle 661 travels along a route 663. Then, both are expected to encounter each other at a point 664 from the route information.

FIG. 14 illustrates a method of allocating an evacuation place under the condition illustrated in FIG. 13 and a method of generating a detour route in a case where the vehicle cannot be evacuated. As illustrated by "665" in FIG. 14, assume that the evacuation place of a general vehicle is allocated to "the evacuation lane which the general vehicle 661 can reach before an encounter point 664 with the emergency vehicle 660". As illustrated by "666" in FIG. 14, the detour route in a case where a parked vehicle or the like is located in the evacuation place and evacuation is not possible is "the route along which the general vehicle 661 passes through evacuation place 665 and does not pass through the encounter point 664 with the emergency vehicle 660". Even if the evacuation place 665 is allocated, if the detour route 666 cannot be generated, the evacuation place is changed and allocated so that a detour route can always be drawn.

The route distribution unit 110 is a process of distributing, to each vehicle, the emergency vehicle travel lane information generated by the emergency vehicle travel lane generation unit 105, the evacuation place information of general vehicles generated by the number of evacuable vehicles calculation unit 107, and the detour route of the general vehicles generated by the detour route derivation unit 108.

It is assumed that the emergency vehicle 200 travels to the destination based on the route information (the emergency vehicle travel lane information generated by the emergency vehicle travel lane generation unit 105) distributed from the route distribution unit 110 on the server 100 side and received by the route information reception unit 203. If the emergency vehicle 200 can be automatically driven, it is possible to perform automated driving control while grasping the surrounding situation by the in-vehicle camera 202 or the like based on the distributed emergency vehicle travel lane information.

Figure 15:
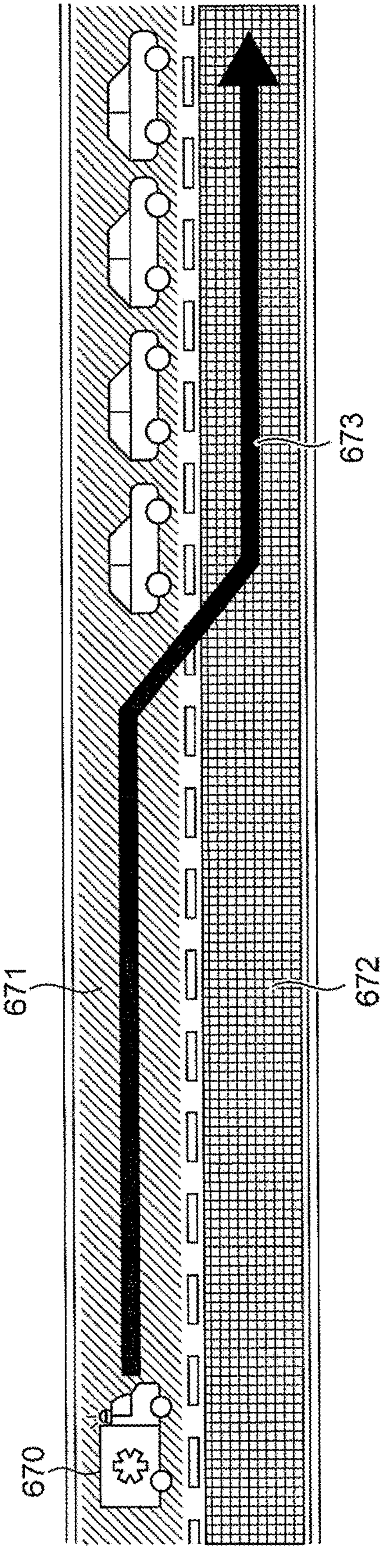
FIG. 15 is an explanatory diagram of vehicle control when an emergency vehicle performs automated driving.

FIG. 15 illustrates an example of automated driving control of the emergency vehicle 200. It is assumed that the server 100 has already distributed, to an emergency vehicle 670 in FIG. 15, the emergency vehicle travel lane information (travel lane pattern 3) that enables driving while completely crossing over to the opposite lane. In this case, upon recognizing that the front is completely occupied due to a traffic jam or the like with the in-vehicle camera or the like, the emergency vehicle 670 performs automated driving so as to enter a lane 672 as a travel lane completely crossing over from a lane 671 as the original travel lane to the opposite lane and draw a path expressed by a lane 673.

It is assumed that the general vehicle 300 capable of performing automated driving travels to a destination based on route information (evacuation place information of general vehicles generated by the number of evacuable vehicles calculation unit 107 and a detour route of general vehicles generated by the detour route derivation unit 108) distributed from the route distribution unit 110 on the server 100 side and received by the route information reception unit 304. At this time, when information on the evacuation place of the general vehicle 300 is included in the route information, the general vehicle 300 checks the state of the evacuation place using the in-vehicle camera 302 or the like near the evacuation place, and the evacuation place use determination unit 301 determines whether or not evacuation to the evacuation place is possible. If the evacuation place use determination unit 301 determines that the evacuation place cannot be used, the general vehicle 300 travels along the detour route distributed at the same time and avoids the emergency vehicle 200. That is, based on the route information received by the route information reception unit 304 and the vehicle peripheral information recognized by the in-vehicle camera 302, the general vehicle 300 causes the evacuation place use determination unit 301 to determine whether it is possible to evacuate from the emergency vehicle 200 and evacuate to the distributed evacuation place. In a case where there is an obstacle or the like in the distributed evacuation place and evacuation is impossible, the general vehicle 300 travels along the detour route distributed separately and avoids the emergency vehicle 200.

It is assumed that the general vehicle 310 that performs independent driving travels to a destination based on route information (evacuation place information of general vehicles generated by the number of evacuable vehicles calculation unit 107 and a detour route of general vehicles generated by the detour route derivation unit 108) distributed from the route distribution unit 110 on the server 100 side and received by the route information reception unit 313. At this time, when information on the evacuation place of the general vehicle 310 is included in the route information, the general vehicle 310 uses the emergency vehicle avoidance information notification unit 311 near the evacuation place to notify, by voice and screen, the driver of information on approach to the emergency vehicle 200, the presentation of the evacuation place for not hindering traveling of the emergency vehicle 200, and a detour route in a case where there is an obstacle or the like in the evacuation place and evacuation cannot be performed, according to the distributed route information. It is assumed that the driver uses this information to decide whether to wait until the emergency vehicle 200 passes through the evacuation place or to avoid the emergency vehicle 200 according to the detour route.

The embodiments of the present invention have been described in detail above. In the present embodiment described above, high-precision map information represented by an HD map is provided on a cloud, and a route to a destination is generated and distributed based on destination information from each vehicle. In this case, an evacuation place or an avoidance route (detour route) is considered from the route information of the emergency vehicle.

The present embodiment can provide the server (the route generation device) 100, the vehicle control device, and the vehicle route distribution system 1 which can guide an emergency vehicle to a destination without delay.

That is, according to the present embodiment, by generating evacuation route information when the emergency vehicle approaches in consideration of the emergency vehicle traveling while crossing over the lane in advance, it is possible to smoothly perform evacuation or detour when the emergency vehicle approaches. In addition, since the route information of the emergency vehicle is closed on the server and is not distributed to the general vehicle side, it is possible to avoid a risk in terms of privacy protection and crime prevention by distributing the route information of the emergency vehicle as described above.

Note that the above-described embodiment has exemplified the case where the general vehicle capable of communicating with the server 100 includes both the general vehicle 300 that supports automated driving and the general vehicle 310 that does not support automated driving (performs independent driving). However, the general vehicle may be constituted by at least one of the general vehicle 300 that supports automated driving and the general vehicle 310 that does not support automated driving (performs independent driving).

Note that the present invention is not limited to the above-described embodiments, and various modifications can be made without departing from the spirit of the present invention described in the claims. For example, the above-described embodiments have been described in detail for easy understanding of the present invention and are not necessarily limited to those having all the described configurations.

In addition, some or all of the above-described configurations, functions, processing units, processing means, and the like may be implemented by hardware, for example, by designing with an integrated circuit. In addition, each configuration, function, and the like described above may be implemented by software by causing a processor to interpret and execute a program for implementing each function. Information such as a program, a table, and a file for implementing each function can be stored in a storage device such as a memory, a hard disk, and a solid state drive (SSD) or a recording medium such as an IC card, an SD card, and a DVD.

In addition, the illustrated control lines and information lines are those considered to be necessary for the description and are not necessarily all control lines and information lines necessary for the implementation. In practice, it may be considered that almost all the configurations are connected to each other.

REFERENCE SIGNS LIST

- 1 vehicle route distribution system
- 100 server for route generation and distribution (route generation device)
- 101 route generation unit
- 102 route information storage unit
- 103 high-precision map data storage unit
- 104 general vehicle traffic count calculation unit
- 105 emergency vehicle travel lane generation unit
- 106 evacuation lane calculation unit
- 107 number of evacuable vehicles calculation unit
- 108 detour route derivation unit
- 109 opposite lane travel determination unit
- 110 route distribution unit
- 200 emergency vehicle
- 201 destination transmission unit for emergency vehicle
- 202 in-vehicle camera of emergency vehicle
- 203 emergency vehicle route information reception unit
- 300 general vehicle capable of automated driving
- 301 evacuation place use determination unit for general vehicle capable of automated driving
- 302 in-vehicle camera of general vehicle capable of automated driving
- 303 destination transmission unit for general vehicle capable of automated driving
- 304 route information reception unit for general vehicle capable of automated driving
- 310 general vehicle performing independent driving
- 311 emergency vehicle avoidance information notification unit of general vehicle performing independent driving

312 destination transmission unit for general vehicle performing independent driving

313 route information reception unit of general vehicle performing independent driving

The invention claimed is:

1. A route generation device comprising a processor configured to:

generate route information of an emergency vehicle and route information of a general vehicle from map information and destination information of the emergency vehicle and the general vehicle;

save the route information of the emergency vehicle and the route information of the general vehicle;

calculate a number of general vehicles traveling on a travel route of the emergency vehicle from the route information of the emergency vehicle and the route information of the general vehicle saved; and generate travel lane information for determining whether a lane, on which the emergency vehicle travels passes is a current travel lane, an opposite lane, or a middle between the current travel lane and the opposite lane, from the number of the general vehicles traveling on the current travel lane and the opposite lane on the travel route of the emergency vehicle;

calculate one or more evacuation lanes along which the general vehicle can evacuate from the travel lane information of the emergency vehicle;

calculate a number of general vehicles that can be evacuated to the evacuation lane for each of the evacuation lanes calculated; and compare the number of general vehicles traveling on the travel route of the emergency vehicle with the number of the evacuable vehicles;

in response to the number of general vehicles traveling on the travel route of the emergency vehicle exceeding the number of the evacuable vehicles, set priorities for each of the general vehicles that cannot be evacuated to the evacuation lanes based on vehicle type or destination such that a general vehicle with a low priority is a general vehicle in which no evacuation lane is allocated;

determine vehicle peripheral information including whether an obstacle is in an evacuation lane;

calculate a detour route for the general vehicle with the low priority provided upon prioritization when at least one of a number of the general vehicles traveling on the travel route of the emergency vehicle exceeds the number of the evacuable vehicles or the general vehicle is unable to evacuate due to the obstacle in the evacuation lane; and distribute the route information of the general vehicle to control the general vehicle to travel to the evacuation lane based on the general vehicle route information.

2. The route generation device according to claim 1, wherein the processor is further configured to:

determine whether or not to allow entry to the opposite lane from obstacle information between the current travel lane and the opposite lane, the obstacle information including presence or absence of a median strip, and generate the travel lane information for determining whether the lane, on which the emergency vehicle travels, passes the current travel lane, the opposite lane, or the middle between the current travel lane and the opposite lane, from the route information of the emergency vehicle indicating whether it is possible to enter the opposite lane.

3. The route generation device according to claim 1, wherein the processor is further configured to distribute the route information of the emergency vehicle and the route information of the general vehicle.

4. A vehicle control device comprising a vehicle control device processor configured to receive the route information of the general vehicle distributed from the route generation device defined in claim 3 and notify a driver of the evacuation lane and a detour route of the general vehicle according to the distributed route information of the general vehicle.

5. A vehicle control device comprising:

a vehicle control device processor configured to receive the route information of the general vehicle distributed from the route generation device defined in claim 3; and an in-vehicle camera that recognizes the vehicle peripheral information, wherein the vehicle control device processor is further configured to:

determine whether it is possible to evacuate to the evacuation lane;

evacuate to the evacuation lane based on the route information of the general vehicle and the vehicle peripheral information, and avoid the emergency vehicle along the detour route when there is the obstacle in the evacuation lane and evacuation is impossible.

6. A vehicle route distribution system comprising:

the route generation device defined in claim 3; and the emergency vehicle and the general vehicle capable of communicating with the route generation device, wherein the emergency vehicle includes an emergency vehicle processor configured to receive the route information of the emergency vehicle and travel according to the distributed route information of the emergency vehicle, and the general vehicle is configured by at least one of:

a general vehicle that includes a general vehicle processor configured to receive the route information of the general vehicle and notify a driver of the evacuation lane and a detour route of the general vehicle according to the distributed route information of the general vehicle, and a general vehicle that includes the general vehicle processor configured to receive the route information of the general vehicle and an in-vehicle camera that recognizes the vehicle peripheral information, determines whether it is possible to evacuate to the evacuation lane and evacuate to the evacuation lane based on the route information of the general vehicle and the vehicle peripheral information, and avoids the emergency vehicle along the detour route when there is the obstacle in the evacuation lane and evacuation is impossible.

* * * * *